(12) United States Patent
Müller

(10) Patent No.: US 9,297,403 B2
(45) Date of Patent: Mar. 29, 2016

(54) SELF-TAPPING SCREW

(71) Applicant: RUIA GLOBAL FASTENERS AG, Neuss (DE)

(72) Inventor: Kurt Müller, Mayen (DE)

(73) Assignee: RUIA GLOBAL FASTENERS AG, Neuss (DE)

( * ) Notice: Subject to any disclaimer, the term of this patent is extended or adjusted under 35 U.S.C. 154(b) by 0 days.

(21) Appl. No.: 14/366,135

(22) PCT Filed: Dec. 19, 2012

(86) PCT No.: PCT/DE2012/200085
§ 371 (c)(1),
(2) Date: Jun. 17, 2014

(87) PCT Pub. No.: WO2013/102453
PCT Pub. Date: Jul. 11, 2013

(65) Prior Publication Data
US 2014/0328646 A1    Nov. 6, 2014

(30) Foreign Application Priority Data

Jan. 3, 2012   (DE) ............... 20 2012 000 045 U

(51) Int. Cl.
F16B 25/04       (2006.01)
F16B 35/04       (2006.01)
F16B 25/00       (2006.01)

(52) U.S. Cl.
CPC ........... *F16B 35/041* (2013.01); *F16B 25/0015* (2013.01); *F16B 25/0042* (2013.01); *F16B 25/0047* (2013.01); *F16B 25/0052* (2013.01)

(58) Field of Classification Search
CPC ................... F16B 25/0078; F16B 25/0015
USPC ........................................... 411/416
See application file for complete search history.

(56) References Cited

U.S. PATENT DOCUMENTS

| | | | |
|---|---|---|---|
| 2,352,982 A | 7/1944 | Tomalis | |
| 3,772,720 A | 11/1973 | Yamamoto | |
| 3,875,780 A * | 4/1975 | Cochrum et al. | 72/90 |
| 3,935,785 A * | 2/1976 | Lathom | 411/413 |
| 5,961,267 A * | 10/1999 | Goss et al. | 411/416 |
| 6,375,401 B1 * | 4/2002 | McNeill | 411/416 |
| 7,677,852 B2 * | 3/2010 | Donovan | 411/361 |

FOREIGN PATENT DOCUMENTS

EP       2 292 939 A2       3/2011

OTHER PUBLICATIONS

International Search Report mailed Mar. 5, 2013; PCT/DE2012/200085.

* cited by examiner

*Primary Examiner* — Flemming Saether
(74) *Attorney, Agent, or Firm* — Ladas & Parry LLP

(57) ABSTRACT

The invention relates to a self-tapping screw with a head and an outer thread support. The core cross-section of the outer thread support has the shape of a rounded n-sided polygon, n being a prime number>3.

1 Claim, 10 Drawing Sheets

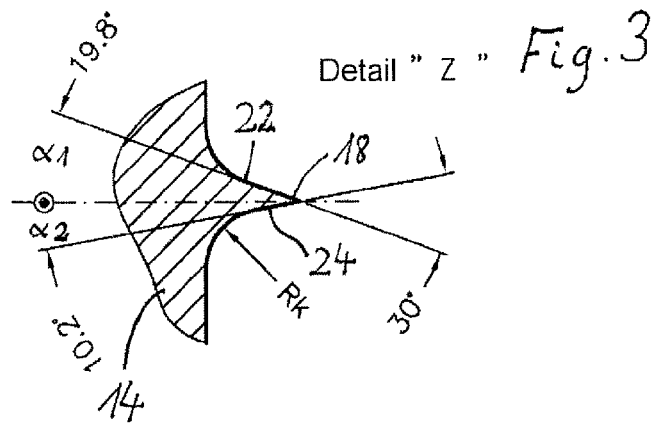
Detail "Z" Fig. 3
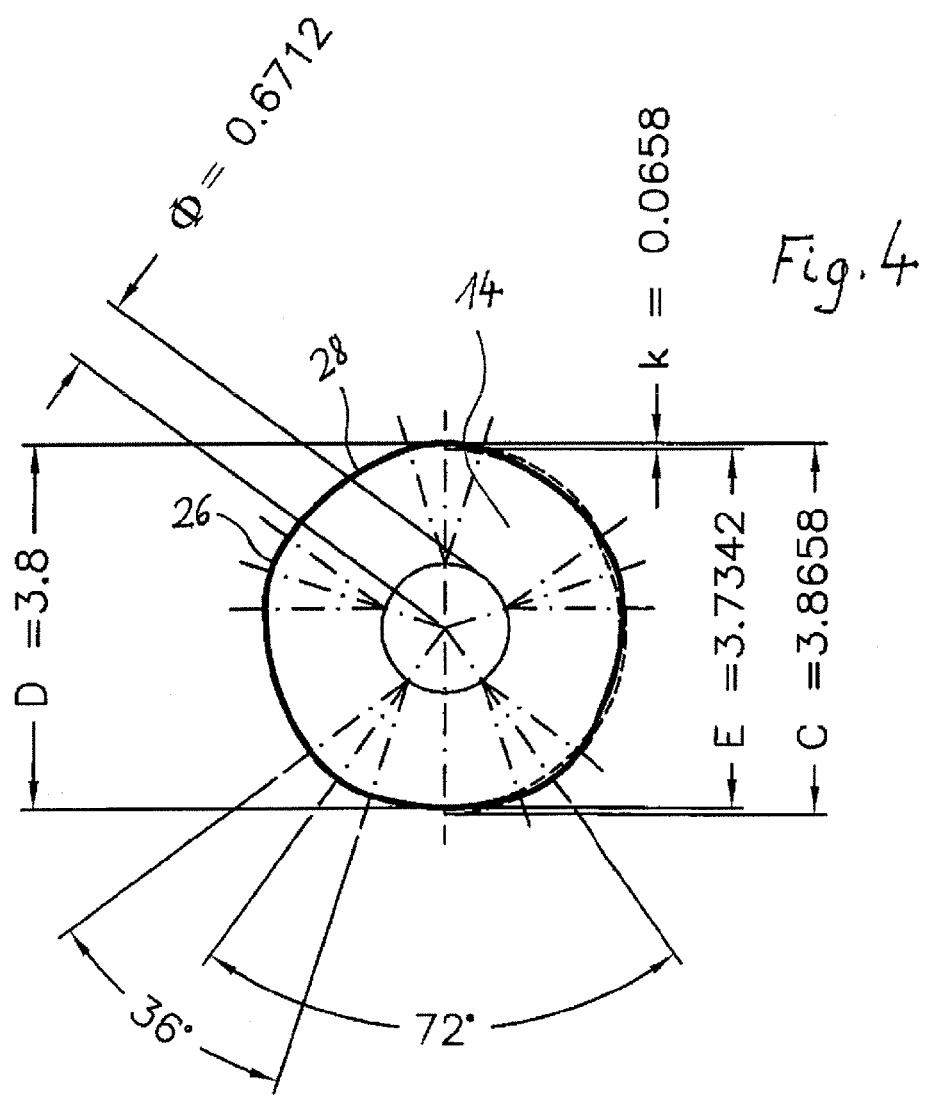
Fig. 4

SELF-TAPPING SCREW

TECHNICAL FIELD

The present invention relates to a self-tapping screw with a head and an outer thread support.

BACKGROUND

Self-tapping screws have been known for a long time. However, they suffer from the problem that, particularly when they are mounted in plastics materials, considerable screwing-in forces are required due to the high friction between the screw material and the plastics material. This problem makes assembly difficult.

SUMMARY

On this basis, the object of the present invention is to develop a self-tapping screw of this type, to simplify assembly.

This object is achieved according to the invention by a self-tapping screw having a head and an outer thread support, in which the core cross section of the outer thread support has the shape of a rounded n-sided polygon, n being a prime number greater than 3. This construction can relieve the component stresses (residual compressive stresses) which arise during the screwing-in procedure by virtue of the clearance (undercut) formed by the polygonal shape. A further result is an additional simplification of assembly due to the improved self-centring during the screwing-in procedure.

For normal screw sizes, a rounded 5-sided polygon as the shape of the core cross section of the outer thread support has proved to be particularly advantageous.

Likewise, the shape of the core cross section of the outer thread support is preferably pentalobular.

A particularly simple production of the screw according to the invention is provided when the shape of the core cross section of the outer thread support is formed by radii which merge into one another tangentially, a large radius and a small radius continually alternating. This configuration is particularly suitable for application to the basic body of the thread support by forming (rolling).

A particularly favourable construction of the shape of the core cross section of the outer thread support is provided in that the centres of the radii which merge into one another lie on a circle with a specific radius around the axis of rotation of the outer thread, the small radii emanating in each case from a point on this side of the rotational axis, whereas the large radii emanate in each case from a point on the other side of the rotational axis.

The construction is further simplified when, from each point, a small radius emanates on the adjacent limiting line of the core cross section and at the same time a large radius emanates on each limiting line opposite the rotational axis of the core cross section.

BRIEF DESCRIPTION OF THE DRAWINGS

In the following, the present invention will be described in more detail with reference to the embodiment described in the accompanying drawings, in which:

FIG. 3 shows the detail "Z" of FIG. 2;

FIG. 4 shows an example of the pentalobular core cross section of the outer thread support of a screw according to the invention;

DETAILED DESCRIPTION

Figure 1:
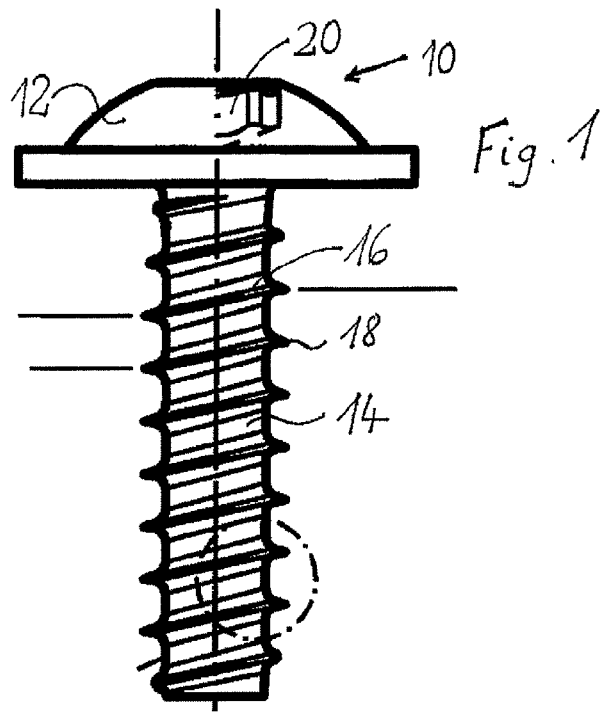
FIG. 1 is a side view of the self-tapping screw according to the invention.

FIG. 1 shows a self-tapping screw 10 according to the invention with a head 12 and an outer thread support 14. Here, the outer thread support 14 has a self-tapping thread 16 which consists of a thread pitch 18, the detailed shape of which is described in more depth in FIG. 2.

The head 12 of the screw 10 is provided with an inner force application 20, in this case it is a hexalobular inner force application. Of course, screws according to the invention can be produced with any other inner or outer force applications.

Figure 2:
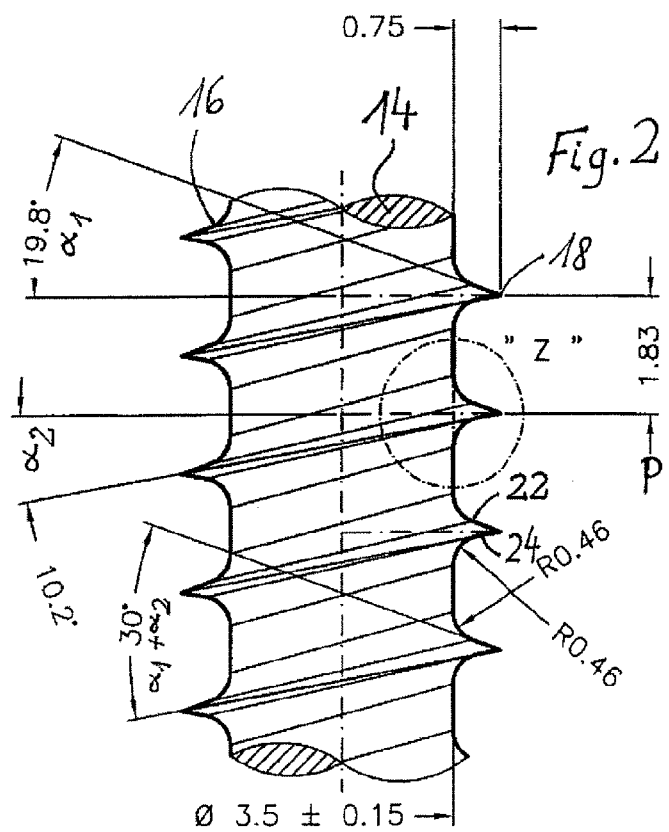
FIG. 2 is an enlarged view of a part of the outer thread support of the screw according to the invention of FIG. 1.

The detailed shape of the outer thread 16 can be seen more clearly in FIG. 2. Here, the thread pitch 18 emanates from the basic body or core of the outer thread support 14 in a rounded manner along a radius and has an intersection angle of its two flanks 22, 24 of 30°. This value has emerged as an optimum empirical value for self-tapping screws.

However, according to the invention, the thread pitch 18 is not symmetrical. In fact, the two flanks 22, 24 thereof each have different angles to the vertical on the rotational axis of the outer thread support 14. Here, flank 22 facing the screw head has an angle of approximately 20°, while flank 24 remote from the screw head 12 has an angle of only approximately 10°.

The thread profile of the outer thread 16 has thus been constructed asymmetrically here. In this respect, it is particularly preferred if the flank angle is divided such that the tangent value is halved. This optimally produces:

$$\tan \alpha_1 = 0.3600 \rightarrow \arctan \alpha_1 = 19.799$$

$$\tan \alpha_2 = 0.1800 \rightarrow \arctan \alpha_2 = 10.201$$

The thread profile height is determined by the strength parameters of screw and component, to provide an adequate safeguard against a stripping off effect.

Due to this choice of the flank angles $\alpha_1$ and $\alpha_2$, the friction coefficient values on the flank halves also change by this amount between the unloaded and the loaded thread flank. A more accurate calculation produces the flank angle side portions, illustrated in FIG. 2, of:

$$\alpha_1 = 19.799° \approx 19.8°$$

$$\alpha_2 = 10.201° \approx 10.2°$$

Figure 9:
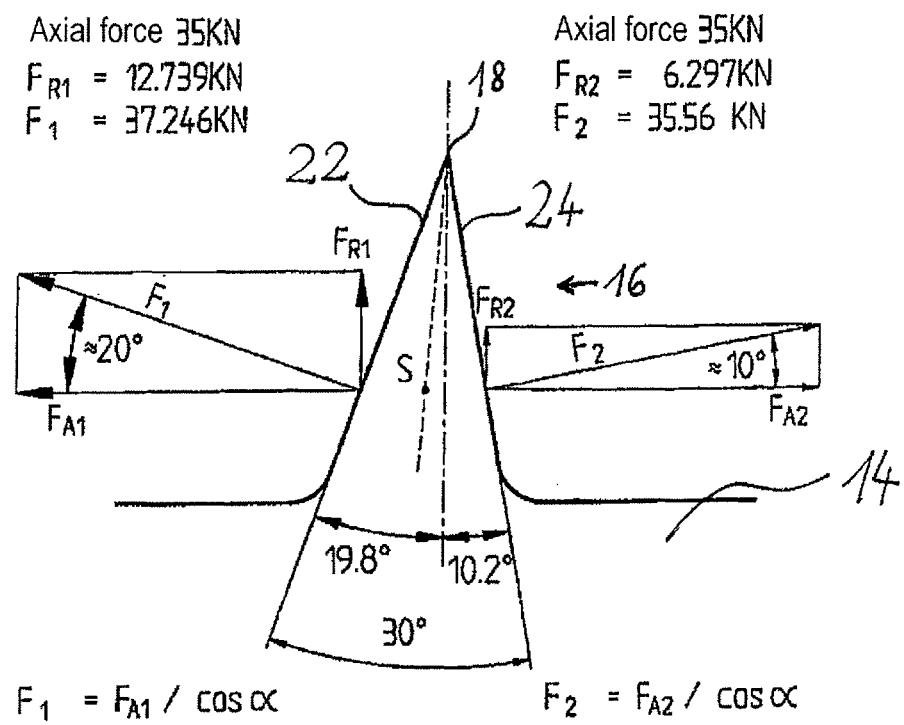
FIG. 9 shows a parallelogram of forces on the thread profile according to the invention.

This change in the tangent value by 50% produces a change in the thread friction coefficient value on the flank halves, and thereby a change in the radial forces and main forces, as illustrated in FIG. 9 by means of force parallelograms.

The shift of the greater radial force towards the loaded flank side provides advantages for the flank friction coefficient value and for the self-locking effect.

The resolution of the axial force in the screw acts as a tensile load on the loaded flank side and as a pressure load on the unloaded flank side by virtue of the component. The pressure load of the component and tensile load of the screw balance the screw connection. This produces the following radial forces:

$$F_{R1} = \tan \alpha_1 * F_A$$

$$F_{R2} = \tan \alpha_2 * F_A$$

and thereby the resulting main forces:

$$F1 = F_A / \cos \alpha_1$$

$$F2 = F_A / \cos \alpha_2$$

Figure 10:
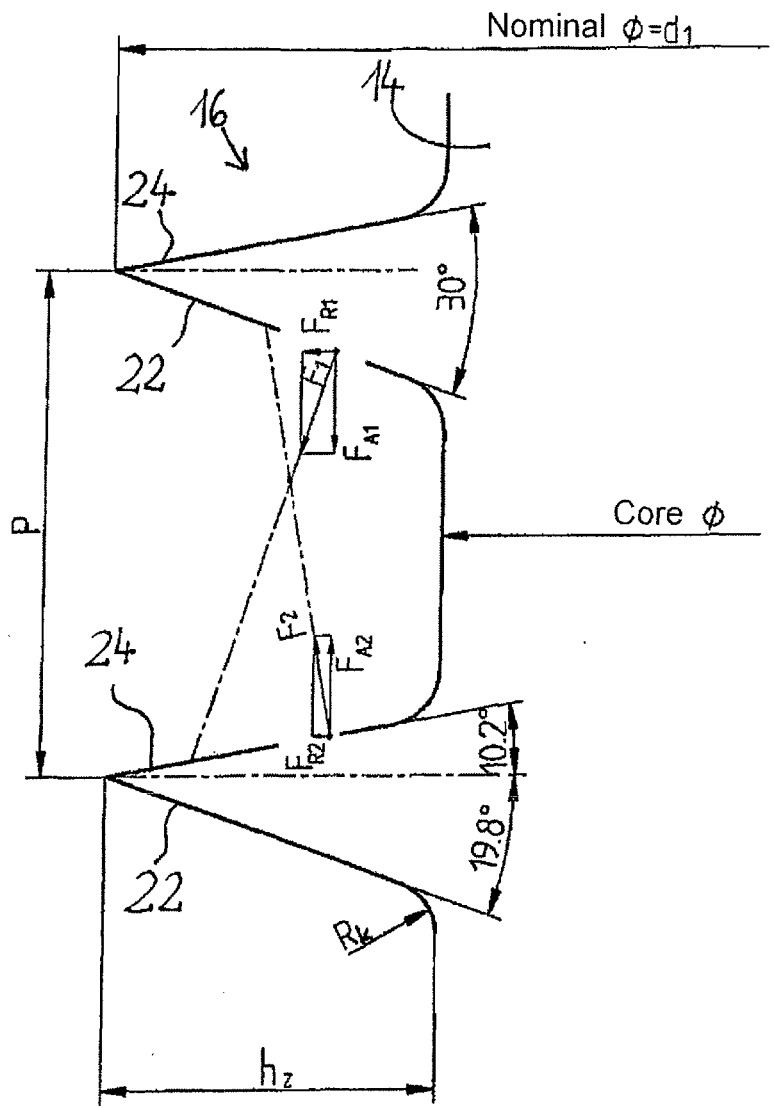
FIG. 10 shows the cooperation of the corresponding forces of FIG. 9 on consecutive thread profiles.

These resulting main forces stand vertically on the thread flanks. The altered main forces give the connection an optimum hold against a shearing-off action by the inner thread, and a favourable overtorque of the screw. This produces the flank shape according to the invention since the main forces ($F_2$ and $F_1$) are absorbed not by the component but by the adjacent thread flank, as illustrated in FIG. 10.

In this respect, FIG. 3 shows the detail "Z" from FIG. 2, in which the shape of the thread profile can be seen more precisely.

Since the tangent values of the halves are also the friction factors on the flank sides 22, 24, the friction of the loaded flank side 22 is twice as great as the friction of the unloaded flank side 24. The self-locking is determined by the friction factor of the loaded flank side 22. This prevents automatic release through vibration. Due to this construction according to the invention, the pre-tension forces are maintained in the connection.

To form the material flow of the thread to be tapped in a controlled manner, the root of the thread is configured with a pitch-dependent radius $R_k$. This radius runs out tangentially from the flank geometry towards the thread root. As a result, no additional notch effects arise in the core cross section, which could cause a reduction in the screw cross section under a tensile load. Finally, according to the invention different optimum values are produced for the pitches and stressed cross sections, subject to the material into which the self-tapping screw 10 according to the invention is to be inserted.

Figure 11:
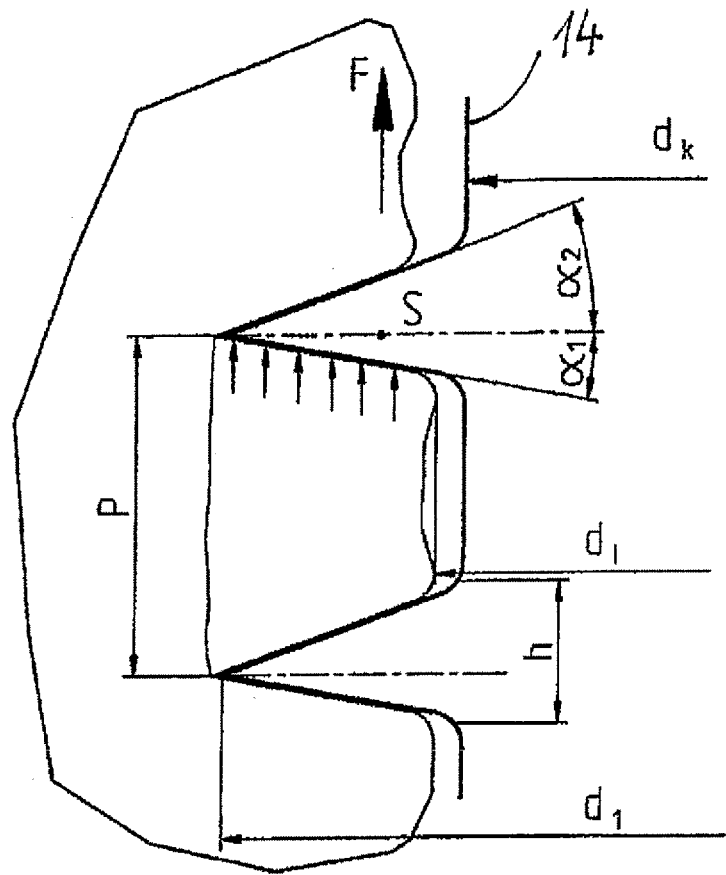
FIG. 11 shows the corresponding forces in the workpiece into which a screw according to the invention has been screwed.

For higher-strength plastics materials (for example thermosetting plastics materials) and diecasting alloys, smaller pitches and greater stressed cross sections are required compared to thermoplastics, so that the screw connection complies optimally with technical requirements. Pitches and core diameter are functions of the external diameter and the strength values of component and screw. The following basic strength principles are required for the mathematical geometric configuration according to FIG. 11:

Shear section of the plastics material:

$$A_{Shear} = d_I * \pi * P$$

where P is the pitch of a thread and $d_I$ is the internal diameter of the hole into which the self-tapping screw is to be inserted.

The stressed cross section of the screw is expressed as:

$$A_S = d_k^2 * \pi / 4$$

where $d_k$ is the core diameter of the screw 10.

The section modulus of the stripping off plastics material is expressed as:

$$W_K = (d_1^4 - d_I^4) / (10 * d_1)$$

where $d_I$ is the internal diameter of the hole into which the screw is to be inserted.

The section modulus of the thread tooth root is expressed as:

$$W_Z = h^2 * d_k * \pi$$

where h is the height of the thread profile, i.e. the difference between the radius of the core of the outer thread and the outer radius of the outer thread.

The following equation is then produced for the screw strength:

$$R_m = F_S / A_S * \pi$$

The following equation is produced for the torque (tightening torque):

$$M_A = F_A * (d_s / 2).$$

FIG. 4 is a sectional view of a pentalobular core according to the invention of an outer thread 14 of a screw 10 according to the invention. Here, it can be seen that this cross section has the shape of a highly rounded 5-sided pentagon.

This shape is produced in that regions 26 with a small radius k and regions 28 with a large radius R continually alternate and the outer contours of the core cross section merge into one another tangentially at the transition points between the regions 26 with a small radius r and the regions 28 with a large radius R.

Figure 6:
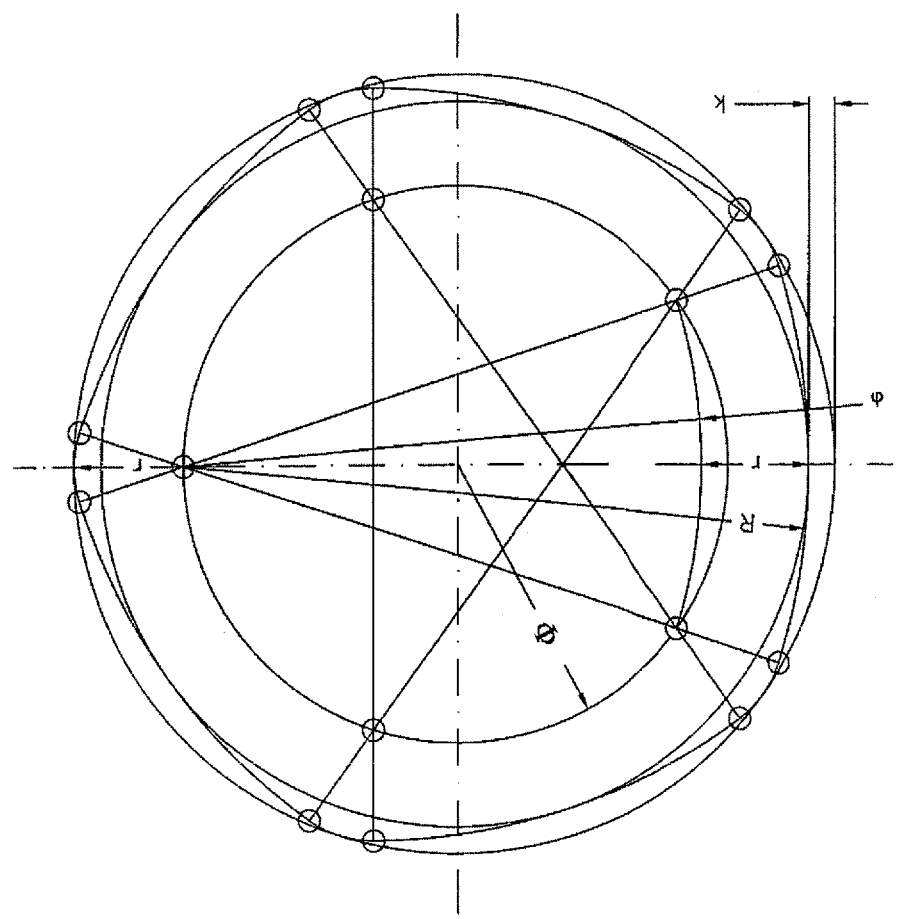
FIG. 6 shows the additional geometric considerations resulting in the construction of FIG. 5.
Figure 7:
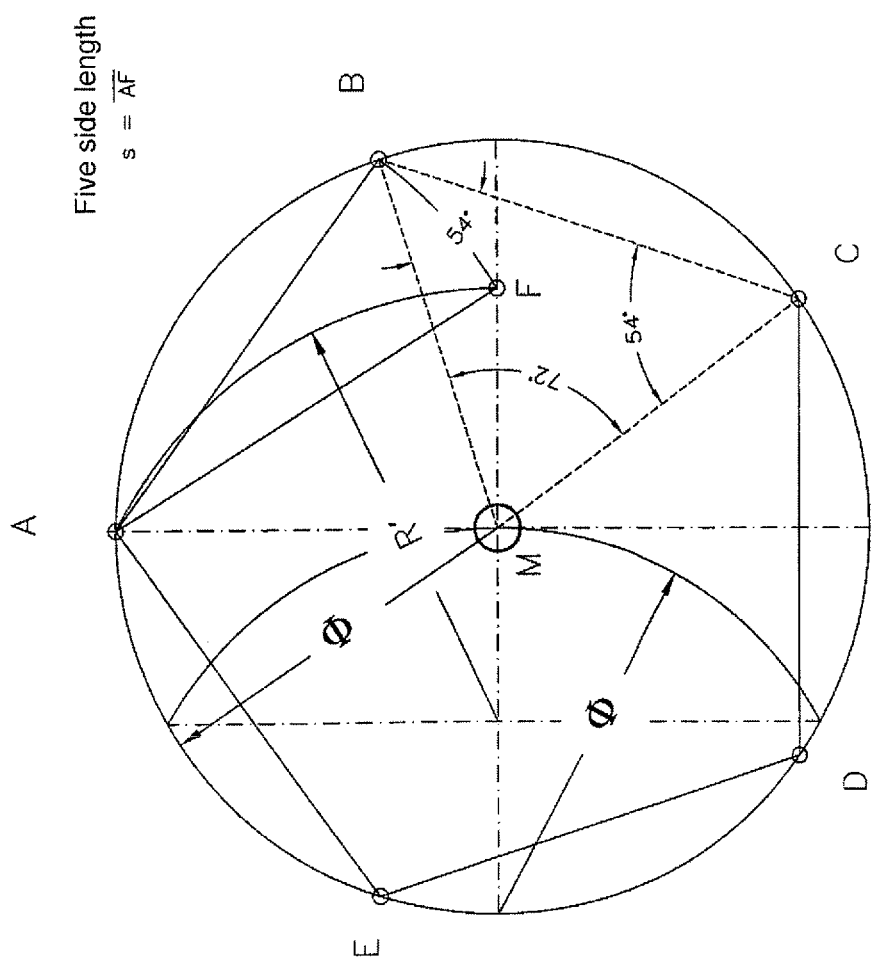
FIG. 7 shows further explanations of the geometric construction of the pentalobular core cross sections according to the invention of the outer thread support.
Figure 8:
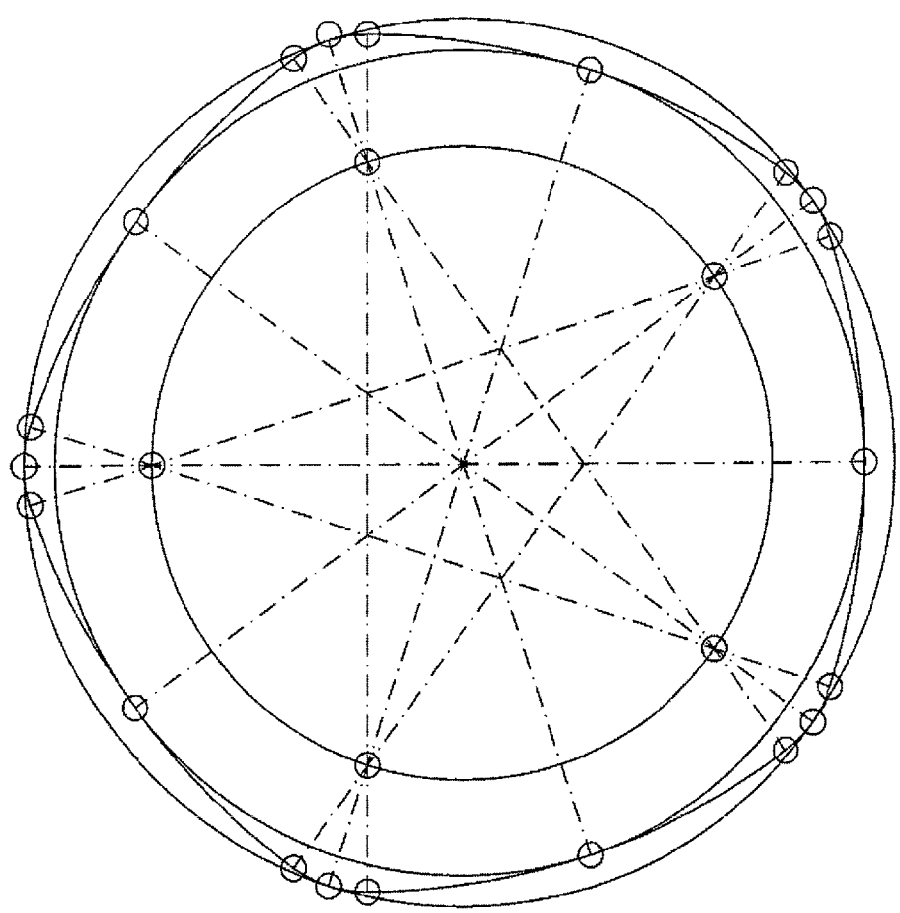
FIG. 8 shows another core cross section according to the invention for an outer thread support having a greater k value.

The construction of the outer contour of the cross section of the core of the outer thread of the self-tapping screw according to the invention will be described in more detail in the following with reference to FIG. 5 to 7, the same characters representing the same distances in the geometric illustration.

Figure 5:
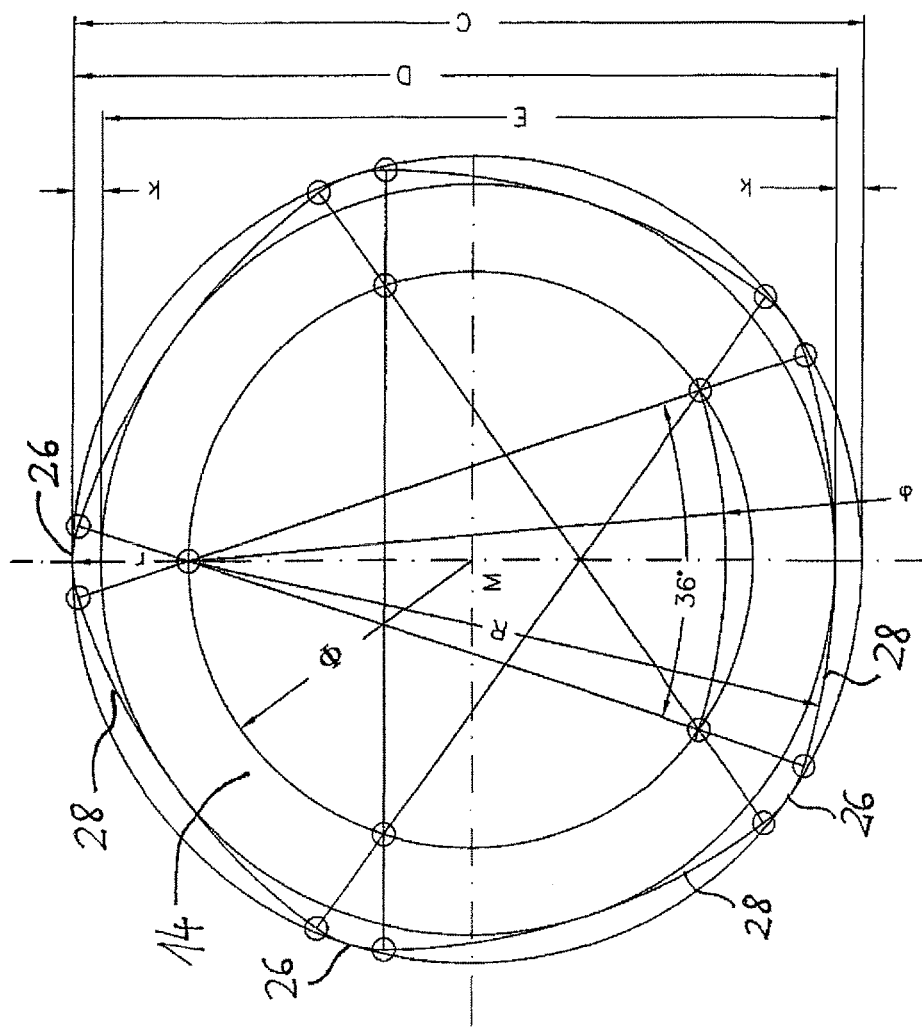
FIG. 5 shows the geometric construction resulting in the cross section of FIG. 4.

FIG. 5 provides a substantially clearer illustration of the corresponding geometric construction.

To construct a corresponding pentalobular cross section, a circle with radius φ is drawn through the slice plane around the point of passage M of the rotational axis of the outer thread. Five equidistant points 30 are determined on this circle and therefore they each have a distance of 72 angular degrees, viewed from the centre M. From these points 30 are drawn small radii r on the side of the points 30 remote from the centre M and large radii R are drawn on the other side of the centre M, viewed from the respective point 30.

In this respect, the following relative sizes apply to the radii R and r:

To calculate these radii, the other quantities in FIG. 5 firstly have to be determined. The starting point here is the average core diameter D predetermined by the standard. This diameter D forms the sum of large radius R and small radius r. Thus:

$$D = R + r.$$

There is also a maximum external diameter of the rotating cross section, identified here by C.

The difference between D and C is the value k; this states the "unroundness" of the respective pentalobular cross section. Thus:

$$C - D = k.$$

The following further derivation for the required quantities is produced thereby:

$$R = r + \varphi$$

$$\varphi = R - r$$

$$\frac{\varphi}{\sin 72°} = \frac{s}{\sin 36°} \rightarrow \varphi = \frac{s \cdot \sin 72°}{\sin 36°}$$

$$s = \Phi * \frac{\sin 72°}{\sin 54°}$$

$$\varphi = \frac{\phi \cdot \frac{\sin 72°}{\sin 54°} \cdot \sin 72°}{\sin 36°} = \phi \cdot \frac{\sin^2 72°}{\sin 54° \cdot \sin 36°}$$

$$R = r + \phi \cdot \frac{\sin^2 72°}{\sin 54° \cdot \sin 36°}$$

$$r = R - \phi \cdot \frac{\sin^2 72°}{\sin 54° \cdot \sin 36°}$$

$$r = C - R - k$$

$$r = r$$

$$C - R - k = R - \phi \cdot \frac{\sin^2 72°}{\sin 54° \cdot \sin 36°}$$

$$C - k + \phi \cdot \frac{\sin^2 72°}{\sin 54° \cdot \sin 36°} = 2R$$

$$\left(C - k + \phi \cdot \frac{\sin^2 72°}{\sin 54° \cdot \sin 36°}\right) \cdot \frac{1}{2} = R$$

$$\boxed{R = \frac{1}{2}C + \left(\phi \cdot \frac{\sin^2 72°}{2 \cdot \sin 54° \cdot \sin 36°} - \frac{1}{2}k\right)}$$

$$R = R$$

$$C - r - k = r + \phi \frac{\sin^2 72°}{\sin 54° \cdot \sin 36°}$$

$$2r = C - \phi \frac{\sin^2 72°}{\sin 54° \cdot \sin 36°} - k$$

$$r = \left(C - \phi \frac{\sin^2 72°}{\sin 54° \cdot \sin 36°} - k\right) \cdot \frac{1}{2}$$

$$\boxed{r = \frac{1}{2}C - \left(\phi \cdot \frac{\sin^2 72°}{2 \cdot \sin 54° \cdot \sin 36°} + \frac{1}{2}k\right)}$$

Finally, the inner circle radius $\phi$ has to be determined from the predetermined quantities, as carried out in the following, using the illustration of the accompanying FIG. 6.

$$R = 2\phi + r - k \rightarrow R - r = 2\phi - k$$

$$R = r + \phi \cdot \frac{\sin^2 72°}{\sin 54° \cdot \sin 36°} \rightarrow R - r = \phi \cdot \frac{\sin^2 72°}{\sin 54° \cdot \sin 36°}$$

$$R - r = R - r$$

$$2\phi - k = \phi \cdot \frac{\sin^2 72°}{\sin 54° \cdot \sin 36°}$$

$$\boxed{\phi = \frac{k}{2 - \frac{\sin^2 72°}{\sin 54° \cdot \sin 36°}}}$$

In the following, preferred thread dimensions for the different material classes of polymer plastics materials, thermoplastics, thermosetting polymers and light metals are stated, to illustrate a particularly preferred embodiment of the invention. For this, the following generally accepted functions are assumed:

Generally accepted functions:
Thread tolerances:
Nominal $\phi = d = D$ according to $\pm$IT 13;
Core $\phi = d_k$ according to ½ IT 14;
Basis for $d = D \rightarrow$ pentalobular
Thread spacing (under head) $a = 2P$ max
Thread crest rounding $r_s = 0.03P$ max
Thread runout $z = 2P$ max$= 0.5 (dv - 0.05))*(1/\tan 13°)$
Dome $\phi$ $dz = dk - 0.05$ Thus, the following values are produced for the individual materials, in each case starting from the nominal diameter d as a variable:

Polymer Plastics Materials
SP Thread Form
Nominal $\phi$ d=Nominal $\phi$ (mm)
Core $\phi$ $d_k = 0.51d + 0.10$ (mm)
Pitch P$=0.45d - 0.01$ (mm)
Tooth height hz$=0.5(d - d_k)$ (mm)
Core radius Rk$=0.15P$ (mm)
Unroundness k$=0.04P$ (mm)

For example, here, for a nominal diameter of 5.0, the pitch P is 2.24 mm, the core diameter $d_k$ is 2.65 mm and the preferred unroundness of the pentalobular cross section k is 0.090 mm.

The roll diameter $d_v$ for these values now has to be determined at a flank angle $\alpha$ of 30°. The roll diameter $d_v$ is a minimum of 3.113 mm, and, as a preferred value due to the reserve of 0.05 mm for the elongation of the thread, it is 3.163 mm. The polygon profile is produced for a preferred pentalobular form, derived from the roll diameter suggestion of $d_v \approx 3.16$ mm$=D$ for the above-described parameters of the geometric construction of the outer contour of the pentalobular cross section:

C$\approx$3.25 mm
D$\approx$3.16 mm
E$\approx$3.07 mm
R$=2.4519$ mm
r$=0.7108$ mm
$\phi=0.9153$ mm and
the cross-sectional area of the polygon-roll cross section A is 7.86 mm².

In the following, the main values (nominal diameter d, pitch P, core diameter $d_k$ and unroundness value k) are set out in a table, to determine the pentalobular outer contour of the polygon-roll cross section k, as follows:

SP thread configuration (all measurements in mm)

| d | 3.0 | 4.0 | 5.0 | 6.0 | 7.0 | 8.0 |
|---|---|---|---|---|---|---|
| P | 1.34 | 1.79 | 2.24 | 2.69 | 3.140 | 3.59 |
| $d_k$ | 1.63 | 2.14 | 2.65 | 3.16 | 3.670 | 4.18 |
| k | 0.054 | 0.072 | 0.090 | 0.108 | 0.126 | 0.144 |

For thermoplastics, the following calculation is provided for the preferred thread parameters:
Thermoplastics
TP Thread Form
Nominal $\phi$ d=Nominal $\phi$ (mm)
Core $\phi$ dk$=0.72d - 0.10$ (mm)
Pitch P$=0.34d + 0.125$ (mm)
Tooth height hz$=0.5(d - dk)$ (mm)

Core radius $R_k=0.25P$ (mm)
Unroundness $k=0.04P$ (mm)

By way of example, here again for a nominal thread diameter of 5.0 mm, the pitch P is 1.83 mm, the core diameter $d_k$ is 3.50 mm and the unroundness of the pentalobular cross section k is 0.073 mm; at a preferred flank angle α of 30°, the roll diameter $d_v$ is 3.745 mm; with a reserve of 0.05 mm for the elongation of the thread, the roll diameter is 3.80 mm. The individual parameters of the pentalobular roll cross section are then:
C≈3.87 mm
k=0.073 mm
D≈3.80 mm
E≈3.73 mm
R=2.6093 mm
r=1.1908 mm
φ=0.7458 mm.

The area A of the polygon-roll cross section A is thereby 11.34 mm².

The main parameters for other nominal diameters d for special screws for thermoplastics are then provided according to the following table, where d is again the nominal diameter, P is the thread pitch, $d_k$ is the core diameter and k is the unroundness of the pentalobular cross section.

TP thread configuration (all measurements in mm)

| d | 2.5 | 3.0 | 3.5 | 4.0 | 4.5 | 5.0 | 6.0 | 7.0 | 8.0 | 10.0 |
|---|---|---|---|---|---|---|---|---|---|---|
| P | 0.98 | 1.15 | 1.32 | 1.49 | 1.66 | 1.83 | 2.17 | 2.51 | 2.85 | 3.53 |
| $d_k$ | 1.70 | 2.06 | 2.42 | 2.78 | 3.14 | 3.50 | 4.22 | 4.94 | 5.66 | 7.10 |
| k | 0.039 | 0.046 | 0.053 | 0.059 | 0.066 | 0.073 | 0.087 | 0.100 | 0.114 | 0.141 |

For thermosetting plastics, the following calculation is provided for the preferred thread parameters:
Thermosetting Plastics
DP Thread Form
Nominal φ d=Nominal φ (mm)
Core φ $d_k$=0.75d−0.04 (mm)
Pitch P=0.19d+0.28 (mm)
Tooth height hz=0.5(d−$d_k$) (mm)
Core radius $R_k$=0.2P (mm)
Unroundness k=0.04P (mm)

By way of example, here again for a nominal thread diameter of 5.0 mm, the pitch P is 1.23 mm, the core diameter $d_k$ is 3.71 mm and the unroundness of the pentalobular cross section k is 0.049 mm; at a preferred flank angle α of 30°, the roll diameter $d_v$ is 3.964 mm; with a reserve of 0.05 mm for the elongation of the thread, the roll diameter is 4.01 mm. The individual parameters of the pentalobular roll cross section are then:
C≈4.06 mm
k=0.049 mm
D≈4.01 mm
E≈3.96 mm
R=2.4850 mm
r=1.5290 mm and
φ=0.5026 mm.

The area A of the polygon-roll cross section A is thereby 12.65 mm².

The main parameters for other nominal diameters d for special screws for thermosetting plastics are then provided according to the following table, where d is again the nominal diameter, P is the thread pitch, $d_k$ is the core diameter and k is the unroundness of the pentalobular cross section.

DP thread configuration (all measurements in mm)

| d | 2.5 | 3.0 | 3.5 | 4.0 | 4.5 | 5.0 | 6.0 | 7.0 | 8.0 | 10.0 |
|---|---|---|---|---|---|---|---|---|---|---|
| P | 0.76 | 0.85 | 0.95 | 1.04 | 1.14 | 1.230 | 1.42 | 1.61 | 1.800 | 2.18 |
| $d_k$ | 1.84 | 2.21 | 2.59 | 2.96 | 3.34 | 3.710 | 4.46 | 5.21 | 5.960 | 7.46 |
| k | 0.030 | 0.034 | 0.038 | 0.042 | 0.045 | 0.049 | 0.057 | 0.064 | 0.072 | 0.087 |

For light metals, the following calculation is provided for the preferred thread parameters:
Light Metals
LM Thread Form
Nominal φ d=Nominal φ (mm)
Core φ dk=0.785d−0.11 (mm)
Pitch P=0.20d+0.30 (mm)
Tooth height hz=0.5(d−dk) (mm)
Core radius $R_k$=0.2P (mm)
Unroundness k=0.04P (mm)

By way of example, here again for a nominal thread diameter of 5.0 mm, the pitch P is 1.30 mm, the core diameter $d_k$ is 3.82 mm and the unroundness of the pentalobular cross section k is 0.052 mm; at a preferred flank angle α of 30°, the roll diameter $d_v$ is 4.027 mm; with a reserve of 0.05 mm for the elongation of the thread, the roll diameter is 4.077 mm. The individual parameters of the pentalobular roll cross section are then:
C≈4.13 mm
k=0.052 mm
D≈4.08 mm
E≈4.03 mm
R=2.5436 mm
r=1.5331 mm and
0=0.5312 mm.

The area A of the polygon-roll cross section A is thereby 13.05 mm².

The main parameters for other nominal diameters d for special screws for light metals are then provided according to the following table, where d is again the nominal diameter, P is the thread pitch, $d_k$ is the core diameter and k is the unroundness of the pentalobular cross section.

LM thread configuration (all measurements in mm)

| d | 3.0 | 4.0 | 5.0 | 6.0 | 8.0 | 10.0 |
|---|---|---|---|---|---|---|
| P | 0.90 | 1.10 | 1.30 | 1.50 | 1.90 | 2.30 |
| $d_k$ | 2.25 | 3.02 | 3.82 | 4.60 | 6.17 | 7.74 |
| k | 0.036 | 0.044 | 0.052 | 0.060 | 0.078 | 0.092 |

Further products having this pentalobular cross section are products with thread forms which form their own female thread and can produce passages with female threads. These are:
Pentalobular, self-tapping fastening element for thin metal sheets
Pentalobular, self-forming fastening element These products have a basic thread form according to DIN 13 and the thread nominal φ also corresponds to the nominal φ "D" of the basic pentalobular shape. The thread dimensions for core and flank φ also relate to the D measurement of the pentalobular cross-sectional shape. This also means that the products φ "C" and "E" also have to be formed for the flank φ and the core φ.

Generally Accepted Functions

Thread tolerances according to DIN 13, valid for polygon φ "D"

Unroundness k=0.075P

Pentalobular, Self-Tapping Fastening Element for Thin Metal Sheets

The commercially available forming point is used for this product having a pentalobular cross section. The thread nominal φ can be taken accordingly from DIN 13 and equated with the corresponding polygon φ "D". Due to the product geometry in the transition region (groove region) and to the pentalobular basic shape, these products are not true to gauge.

Consequently, the following geometric dimensions are produced for the pentalobular self-tapping fastening elements for thin metal sheets:

All measurements are stated in mm.

| Thread | M 4 | M 5 | M 6 |
|---|---|---|---|
| Thread nominal Ø-D | 4.0 | 5.0 | 6.0 |
| Pitch-P | 0.7 | 0.8 | 1.0 |
| Core nominal Ø-$d_k$ | 3.141 | 4.019 | 4.773 |
| Unroundness-k | 0.053 | 0.060 | 0.075 |
| Enveloping circle Ø-C | 4.05 | 5.06 | 6.08 |
| Inscribed circle Ø-E | 3.95 | 4.94 | 5.92 |

Further thread dimensions with this cross-sectional shape can also be produced.

Pentalobular, Self-Forming Fastening Element

This product with a pentalobular cross section has a thread form according to DIN 13. These products are not true to gauge due to the product transition of the form and groove region and to the pentalobular basic shape.

All measurements are stated in mm.

| Thread | M 4 | M 5 | M 6 |
|---|---|---|---|
| Thread nominal Ø-D | 4.0 | 5.0 | 6.0 |
| Pitch-P | 0.7 | 0.8 | 1.0 |
| Core nominal Ø-$d_k$ | 3.141 | 4.019 | 4.773 |
| Unroundness-k | 0.053 | 0.060 | 0.075 |
| Enveloping circle Ø-C | 4.05 | 5.06 | 6.08 |
| Inscribed circle Ø-E | 3.95 | 4.94 | 5.92 |

Further thread dimensions with this cross-sectional shape can also be produced.

Figure 12:
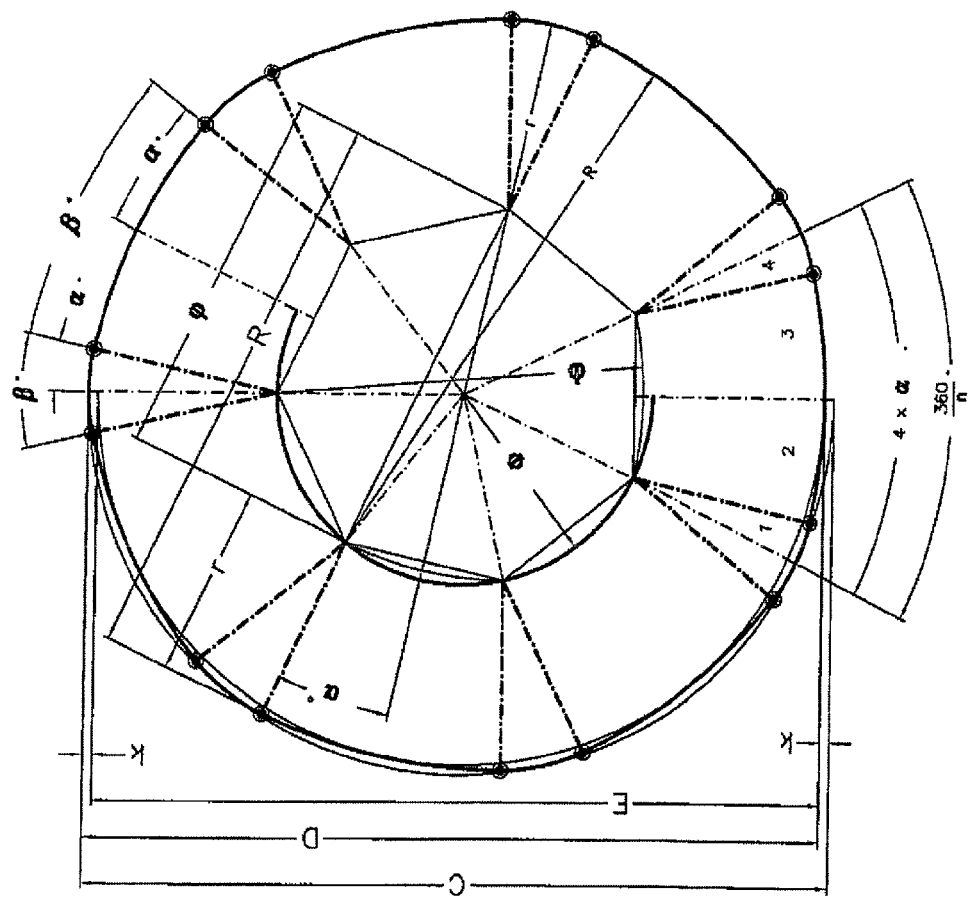
FIG. 12 shows a core cross section according to the invention with a greater number of sides, namely a heptalobular cross section together with the geometric constructions required for this purpose.

As an example of another embodiment of the present invention with a greater number of polygon sides (n=7), FIG. 12 shows the geometric construction and the corresponding dimensioning for a heptalobular cross section, i.e. for a core cross section in the form of a rounded 7-sided polygon.

According to the invention, the following formulae are generally valid for the calculation of any N-lobular cross sections, n designating the number of rounded polygon sides and k designating the function of the thread pitch:

$$\alpha = \frac{360°}{n*4}$$

$$C = D + k$$

$$D = R + r$$

$$\Phi = \frac{1}{(2*(1-\cos\alpha))}*k$$

$$\varphi = \frac{\cos\alpha}{(1-\cos\alpha)}*k$$

$$R = \frac{1}{2}*C + \left(\frac{1}{(2*(1-\cos\alpha))} - 1\right)*k$$

$$r = \frac{1}{2}*C - \frac{1}{(2*(1-\cos\alpha))}*k$$

The invention claimed is:

1. A self-tapping screw with a head and an outer thread support, wherein a core cross section of the outer thread support has the shape of a rounded n-sided polygon, wherein n is 5 or 7, and the shape of the rounded n-sided polygon is formed from 2 times n curved portions with a large radius R and a small radius r in alternation, n-centers of the radii R, r being positioned at equal distances from one another on an auxiliary circle which is arranged coaxially inside the core cross section and has a radius φ, and each center being associated with a closest curved portion with a small radius r and with an opposite curved portion with a large radius R on the auxiliary circle above the center, wherein the dimensions of the core cross section of the outer thread support are determined as follows, k being a desired unroundness, subject to a material, of the thread cross section, C being an enveloping circle diameter and D a thread internal diameter:

$$\propto = \frac{360°}{n*4}$$

$$C = D + k$$

$$D = R + r$$

$$\Phi = \frac{1}{(2*(1-\cos\alpha))}*k$$

$$\varphi = \frac{\cos\alpha}{(1-\cos\alpha)}*k$$

$$R = \frac{1}{2}*C + \left(\frac{1}{(2*(1-\cos\alpha))} - 1\right)*k$$

$$r = \frac{1}{2}*C - \left(\frac{1}{(2*(1-\cos\alpha))} - 1\right)*k$$

* * * * *